Patented Dec. 7, 1937

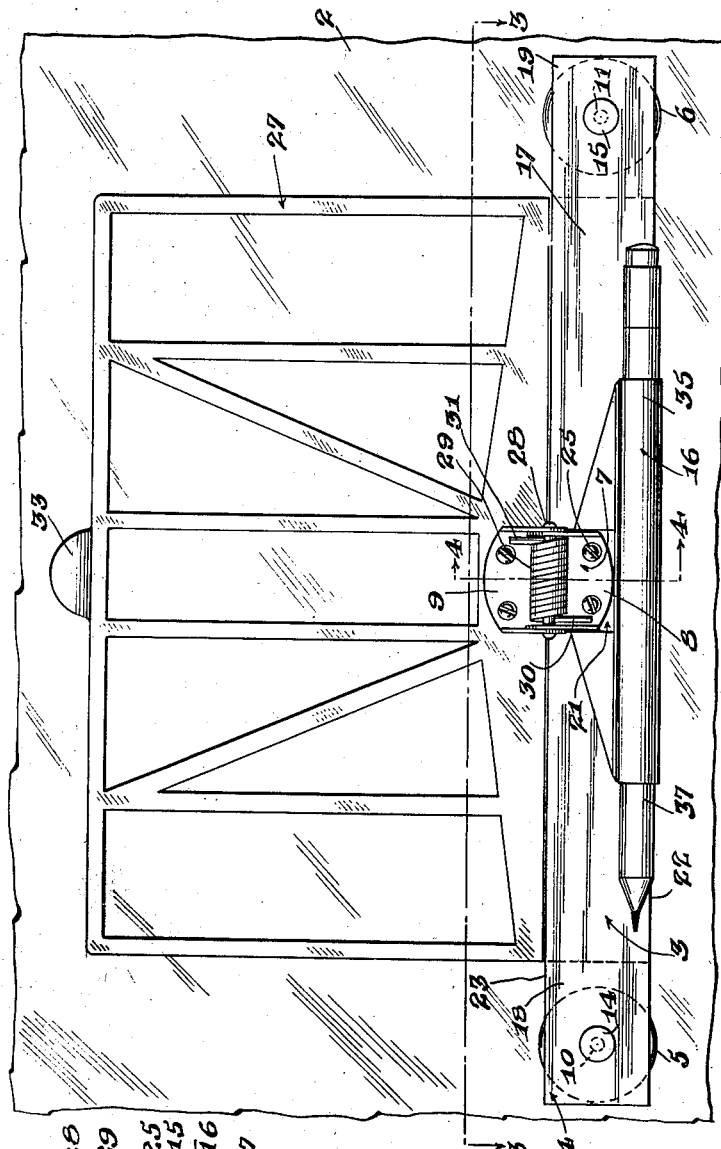

2,101,220

UNITED STATES PATENT OFFICE 2,101,220

HOLDER

Fred A. Kiser, Lamar, Kans.

Application June 19, 1936, Serial No. 86,204

1 Claim. (Cl. 248—205)

This invention relates to a holder designed primarily for application to the inner face of the windshield of an automotive vehicle, more especially of the truck type, for holding papers, relative to the windshield, but it is to be understood that a holder in accordance with this invention may be employed in any connection for which it is found applicable, and the invention has for its object to provide, in a manner as hereinafter set forth, a holder for releasably holding papers relative to a face of and to overcome the securing of the papers by cementitious material to a windshield.

A further object of the invention is to provide, in a manner as hereinafter set forth, a holder for releasably holding papers and a writing instrument relative to one of the faces of the windshield of an automotive vehicle.

A further object of the invention is to provide, in a manner as hereinafter set forth, a holder including means for detachably securing it to one face of a support such as the transparent panel of a windshield, and means forming a pivoted resilient clamp tending to permanently bear against such panel for releasably clamping an article to the windshield.

Further objects of the invention are to provide, in a manner as hereinafter set forth, a holder for the purpose referred to which is simple in its construction and arrangement, strong, durable, compact, readily assembled, thoroughly efficient in its use, conveniently attached to an object, such as the transparent panel of a windshield, and comparatively inexpensive to manufacture.

With the foregoing and other objects in view, the invention consists of the novel construction, combination and arrangement of parts as will be more specifically described and as are shown in the accompanying drawing, but it is to be understood that changes, variations and modifications may be resorted to which fall within the scope of the invention as claimed.

In the drawing:

Figure 1 is a front elevation of the holder showing by way of example the adaptation thereof relative to one face of the transparent element of the windshield of an automotive vehicle, Figure 2 is an elevation looking towards one edge of the holder with the latter applied to a windshield, Figure 3 is a section on line 3—3, Figure 1, and Figure 4 is a section on line 4—4, Figure 1.

With respect to the drawing, 1 indicates a windshield and 2 the transparent panel of the latter.

The holder includes a combined anchoring and supporting structure 3 consisting of a base member in the form of an elongated, flat, oblong bar 4 of the desired width and length, disposed on its lower lengthwise edge and preferably of materially less length than the width of panel 2, a pair of resilient suction cups 5, 6 providing the anchoring means for the holder, a spring controlled hinge structure 7 having a fixed and a shiftable leaf 8, 9 respectively, threaded stems 10, 11 for the cups 5, 6 respectively, abutment collars 12, 13 on the stems 10, 11 respectively, securing caps 14, 15 for engagement with the stems 10, 11 respectively, and an open top resilient receiver or clamp 16.

The bar 4 is formed of an intermediate portion 17 and a pair of end portions 18, 19. The portion 15 is of materially greater length and thickness than that of the portions 18, 19. The reduced end terminal portions 18, 19 are provided by forming the forward face of the bar 4 with a pair of oppositely disposed rabbets. The reduced end terminal portions are apertured for the passage of the stems 10, 11. The rear faces of the portions 18, 19 are flush with the rear faces of portion 17. The forward faces of the portions 18, 19 are arranged rearwardly of the forward face 20 of portion 17. The latter centrally of its rear face is formed with a transverse groove 21 which extends from a point adjacent the bottom edge 22 of and to the top edge 23 of the portion 17. The groove 21 gradually increases in depth from its lower to its upper end whereby the bottom wall 24 of groove 21 inclines inwardly from its lower to its upper end. The receiver 16 is disposed lengthwise of the rear face of bar 4 and has its central part arranged below the lower end of groove 21.

The leaf 8 of the hinge structure 7 is of yoke-shaped contour, has its base arranged within and anchored with the bottom wall 24 of groove 21 by the holdfast devices 25. The sides of the leaf 8 extend above the upper end of its base and are apertured. The holder includes a skeleton clamping arm 27. Against the central part of the lower marginal portion of the rear face of said arm is positioned the leaf 9 of the hinge structure 7. The leaf 9 is of yoke-shaped contour. The sides of leaf 9 depend below the lower end of its base and are apertured. The upper ends of the sides of the leaf 8 are arranged between the lower ends of the sides of the leaf 9. The leaves 8, 9 are connected together by a pivot or pintle 28 upon which leaf 9 shifts. The pivot 28 extends through the apertured upper ends of the sides of leaf 8 and the apertured lower ends of the sides of the leaf 9. The pivot 28 is suitably connected to the leaves 8, 9 to prevent its separation therefrom. The leaf 9 is anchored to the arm 27 by the holdfast means 29. Mounted on the pivot 28 is a coiled controlling spring 30 having one of its ends, as at 31 extended and bearing against leaf 8. The other end of spring 30 is extended as at 32 and bears against the leaf 9.

Centrally of the top edge of the arm 27, the latter is provided with a finger or thumb piece 33. The spring 30 normally tends to bind the upper end of arm 27 against the panel 2 and coacts with arm 27 to releasably clamp a paper or papers, not shown, against the rear face of panel 2.

The stems 10, 11 are anchored at their forward ends in and at the axes of the cups 5, 6 respectively and extend through openings 33, 34 respectively formed in the end portions 18, 19 of bar 4. The abutment collars 12, 13 are mounted on the stems 10, 11 respectively between the cups 5, 6 respectively and the forward faces of the end portions 18, 19. The cups 5, 6 act to releasably secure the bar 4 to the panel 2.

The receiver 16 consists of an open top resilient body 35 formed centrally thereof with a stem 36 which seats on the bottom wall 24 of groove 21 and bears against the base of leaf 6. The holdfast means 25, in connection with the base of leaf 8 anchors the stem 36 to bar 4. A marking implement 37 is shown releasably mounted in the receiver 16.

What I claim is:—

Means for securing a spring controlled clamping element in juxtaposition to a cooperating surface, comprising an oblong base member formed intermediate the ends of its rear face with a vertical groove for receiving the lower end of said element, said member being formed on its forward face with spaced oppositely disposed rabbets to provide said member with reduced end terminal portions, means on the forward faces of said end terminal portions for detachably securing said member directly against said surface, and said groove gradually increasing in depth from its lower to its upper end.

FRED A. KISER.